June 28, 1949.   W. C. P. ZABEL ET AL   2,474,451
CULINARY UTENSIL
Filed Dec. 7, 1945
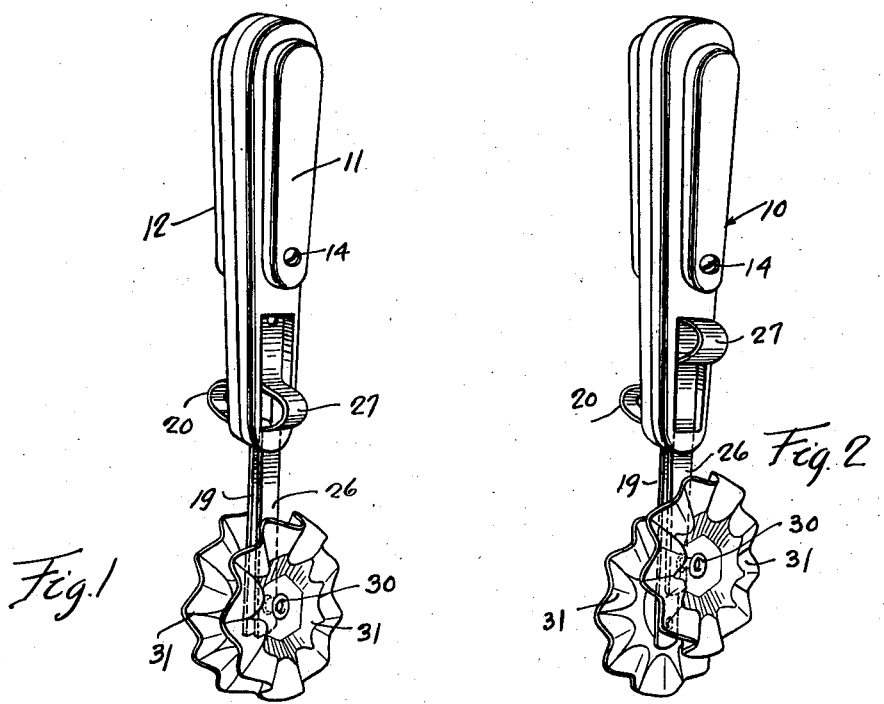
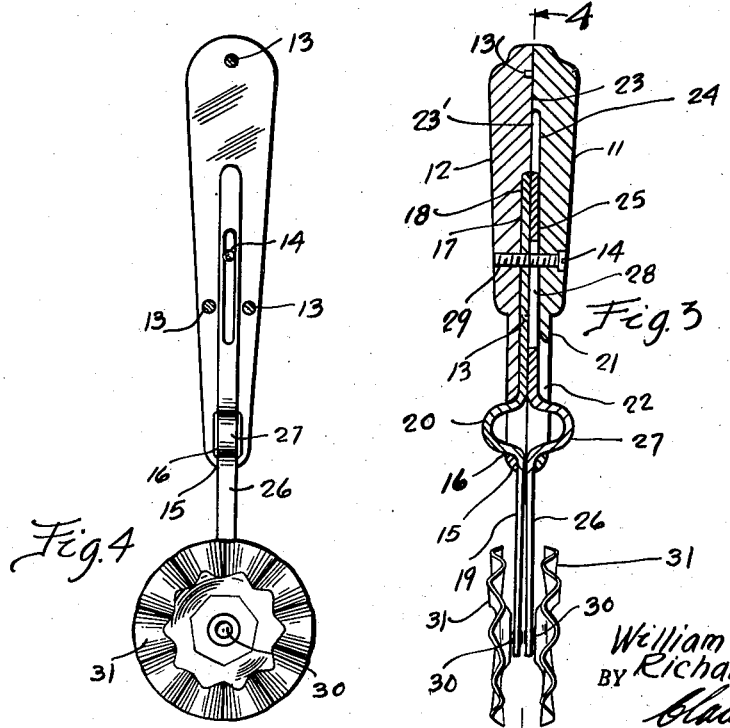
INVENTORS
William C. P. Zabel &
BY Richard C. Helfenbein
Their Attorney Patented June 28, 1949

2,474,451

UNITED STATES PATENT OFFICE 2,474,451

CULINARY UTENSIL

William C. P. Zabel and Richard C. Helfenbein, Chicago, Ill., assignors to Plasmeti Corporation, Chicago, Ill., a corporation of Illinois Application December 7, 1945, Serial No. 633,455

3 Claims. (Cl. 30—307)

This invention relates to certain new and useful improvements in a culinary utensil. More particularly the invention relates to a combination stripper and trimming tool and has for its principal object the provision of an improved construction of this character which will be highly efficient in use and economical in manufacture.

A principal object of this invention is the provision in a culinary utensil wherein there are employed substantially spaced cooperative stripping discs or cutting wheels, with one of the wheels arranged for retraction with respect to the other, whereby the tool may be used for trimming or other operations by the manipulation of the tool with but a single wheel.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a perspective view of the culinary utensil embodied in the invention;

Fig. 2 is a perspective view similar to that shown in Fig. 1, but showing one of the discs or wheels in retracted position with respect to the other disc or wheel;

Fig. 3 is a longitudinal sectional detail view of the same;

Fig. 4 is a sectional detail view of the same taken substantially on line 4—4 of Fig. 3.

The drawings illustrate the preferred form of construction by which the several objects of my invention are accomplished.

In this connection, our improved culinary utensil comprises a handle 10 consisting of two parts 11 and 12 which, when secured together by means of locating pins 13 and a screw 14, constitute the handle 10. The handle part 12 is provided at its lower end portion 15 with an opening 16, and extending longitudinally with respect to the handle part 12 there is provided a groove or recess 17. In this groove or recess 17 is mounted an end portion 18 of an arm 19, the medial portion of which is provided with an outwardly extending loop 20 which projects through the opening 16.

The handle part 11 is provided at its lower end portion 21 with an elongated slot 22. In the face 23 of the handle portion 11, which is in abutment with the face 23' of the handle part 12, there is formed an elongated recess or groove 24. Mounted for slidable movement in this groove 24 is the upper end portion 25 of an arm 26 extending in parallel relation with respect to the arm 19 and having its medial portion provided with an outwardly extending loop 27 which works in the slot 22 of the handle part 11. In this upper end portion 25 of the arm 26 there is provided an elongated slot 28 through which the shank 29 of the attachment screw 14 projects.

At the lower end portions of the arms 19 and 26 there are rotatably connected as at 30, in any suitable manner, oppositely disposed corrugated cutting discs or wheels 31.

With the cutting discs or wheels 31 disposed in opposite parallel relationship with respect to each other, the utensil may be utilized for cutting strips of dough for use in making lattice-work or criss-cross pies.

The utensil with the wheels disposed in this position may be used for many other purposes, such for example, cutting strips of noodles or the like. For trimming purposes or for purposes of cutting decoratively or cubing material used in making pastries, the one wheel 31 may be retracted with respect to the other wheel. This is accomplished by holding the handle in the palm of the hand, with the loop 20 bearing against the index finger and the thumb firmly resting upon the loop 27. Then, by buckling the thumb so as to exert an upward pressure against the loop 27, the arm 26 will be moved longitudinally with respect to the handle 10, and, in this movement, retract the disc or wheel 31 carried thereby. In this position of the retracted wheel 31, the projected wheel 31 may be used for the purposes hereinbefore stated or for many other purposes, such, for example, cutting vegetables, etc.

The foregoing description demonstrates the simplicity of construction of our utensil, and from this description it will be apparent that a utensil for the purposes hereinbefore set forth may be utilized for many purposes; that it is of a sanitary construction, simple in operation, easily cleaned, and one not likely to become out of order.

While we have shown and described the cutting discs or wheels as being corrugated, it is to be understood that these wheels may be of any approved construction or design.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having thus described our invention, what we claim as new and desire to protect by Letters Patent is:

1. A culinary utensil comprising a handle, a pair of cutting wheels adapted to be positioned in spaced alignment with respect to each other, means for supporting one of said wheels in fixed position with respect to said handle, means for supporting the other of said wheels from said handle for movement from aligned position with respect to said one wheel, said last-named means comprising an arm supporting said other of said wheels, a groove and loop connection between the arm and the handle, the groove permitting the arm to be moved longitudinally of the handle and the loop being adapted to be engaged by a thumb to facilitate moving the arm longitudinally of said handle.

2. A utensil of the class described comprising a handle, a pair of arms extending from the handle, one of said arms being movable longitudinally relative to the other of said arms and with respect to said handle, said other arm having a medial loop formed therein, said handle having an opening through which said loop projects, said one arm having a medial loop formed therein, said handle having an elongated slot through which said second mentioned loop projects, and cutting wheels carried by the outer end portions of said arms.

3. A utensil of the class described comprising a handle, a pair of arms extending from the handle, one of said arms being movable relative to the other and to the handle, the other of said arms providing a fixed loop adapted to engage the index finger of the hand when said handle is held in the palm thereof, the movable arm being provided with a loop adapted to engage the thumb of the hand when said index finger engages said fixed loop, said handle having an elongated slot in which said movable loop is adapted to be moved to vary the relative position between said arms, and cutting wheels carried by the outer end portions of said arms.

WILLIAM C. P. ZABEL.
RICHARD C. HELFENBEIN.

REFERENCES CITED

The following references are of record in the file of this patent:

UNITED STATES PATENTS

| Number | Name | Date |
|---|---|---|
| 267,106 | Purdy | Nov. 7, 1882 |
| 1,529,879 | Dolny | Mar. 17, 1925 |